United States Patent [19]

Guyer

[11] 4,255,137
[45] Mar. 10, 1981

[54] PORTABLE END HEATER FOR PLASTIC HOSE

[75] Inventor: Nathan E. Guyer, Stoneham, Mass.

[73] Assignee: American Biltrite, Inc., Cambridge, Mass.

[21] Appl. No.: 43,365

[22] Filed: May 29, 1979

[51] Int. Cl.³ ............................ F24J 3/00; F27D 5/00
[52] U.S. Cl. .................................. 432/225; 432/226; 432/231; 432/253
[58] Field of Search .............. 432/225, 226, 227, 231, 432/232, 253

[56] References Cited

U.S. PATENT DOCUMENTS

| | | | |
|---|---|---|---|
| 1,407,412 | 2/1922 | Harvey et al. | 432/225 |
| 2,100,639 | 11/1937 | Doolittle et al. | 432/225 |
| 2,515,300 | 7/1950 | Haber et al. | 432/231 |
| 3,043,017 | 7/1962 | Strickland et al. | 432/232 |
| 3,082,760 | 3/1963 | Jaeger | 432/231 |
| 4,014,640 | 3/1977 | Emery et al. | 432/225 |
| 4,088,439 | 5/1978 | Dohren | 432/225 |
| 4,097,573 | 6/1978 | Parmann | 432/253 |

FOREIGN PATENT DOCUMENTS 294878 10/1916 Fed. Rep. of Germany .......... 432/231

*Primary Examiner*—John J. Camby
*Attorney, Agent, or Firm*—Weingarten, Maxham & Schurgin

[57] ABSTRACT

A heating device, particularly useful for heating the end portions of hollow elongated objects such as thermoplastic hose or tubing, comprises an enclosure for substantially surrounding the end portion of the object, means for substantially immobilizing the end portion within the enclosure and means for directing a stream of heated gas around the inside and outside of the object along the length of the end portion. In a preferred embodiment, the enclosure is an insulated metal circular cylinder having at one end apertures for receiving thermoplastic hose and controlling gas flow. At the other end, the enclosure has an apertured conical member for insertion into the hose to immobilize it in axial alignment with the cylinder. A gas flow conduit for introducing a stream of heated air substantially tangentially onto the inner and outer surfaces of the hose cooperates with the walls of the hose and the enclosure to whirl hot air helically around the inner and outer surfaces of the hose along the length of the end portion.

10 Claims, 3 Drawing Figures

PORTABLE END HEATER FOR PLASTIC HOSE

FIELD OF THE INVENTION

This invention relates to heating devices. More specifically, it relates to a portable heating device particularly useful for heating the end portions of thermoplastic hose or tubing and thereby facilitating the fitting of such hose or tubing onto a rigid coupling shank.

BACKGROUND OF THE INVENTION

Flexible thermoplastic hose is used in a wide variety of industrial applications. In typical applications, such as food processing, the hose provides a physical conduit interconnecting successive machines in the processing line. The flexible hose is typically coupled to the processing machines by rigid coupling shanks in the form of short tubular sections. In order to obtain an effective seal, the coupling shanks usually have an outer diameter somewhat larger than the inner diameter of the hose.

It is common practice to heat locally the end portions of the hose in order to facilitate their fitting onto the coupling shanks. Heat, properly applied, can soften the thermoplastic material of the hose and render it sufficiently pliable and elastic to fit onto the larger diameter shanks. Typically heat is applied by dipping the end portion of the hose in a container of hot liquid, such as boiling water or heated ethylene glycol. Alternatively, the ends can be heated by manually directing a stream of hot air onto the hose end or subjecting the hose to radiant heat.

None of these heating techniques, however, has proved wholly satisfactory for larger diameter hose having diameters of three inches or more. Dipping in hot liquids, for example, poses a safety hazard due to spillage and splashing and, in addition, introduces potential contaminants into the interior of the hose. The hazard of spillage and splashing arises because of the difficulty in controlling such hose while lowering an end portion into an upright container of hot liquid. The hose is elastic, difficult for a man to bend into short arcs and heavy for a man to handle (a thirty-foot length of eight-inch hose weighs about 225 pounds). Consequently, there is a substantial danger during dipping that the hose will escape from control with consequent spilling, flipping or splashing of boiling hot liquid.

The danger of chemical contamination arises because heated liquids other than water are often used in order to speed up the softening process. In order to reduce the period of time the hose must be held in dipping position, many users employ liquids, such as glycol, having boiling temperatures higher than that of water. Such liquids, however, are necessarily introduced into the interior of the hose where they are potential contaminants to materials passing through the hose. Glycol, for example, would be a poisonous contaminant in food processing hose.

Manual direction of hot air onto the hose is both tiresome and ineffective. It is tiresome because the operator must continuously redirect the hot air source so that it heats all portions of the end in a substantially uniform manner. It is ineffective because the operator is generally unsuccessful in obtaining uniform heating, resulting in a difficult fit and producing localized weak spots in the expanded hose.

Radiant heating is not practical. The surface exposed to radiant heat overheats and begins to smoke and decompose long before the entire thickness is soft enough to expand.

SUMMARY OF THE INVENTION

In accordance with the invention, a heating device, particularly useful for heating the end portions of hollow elongated objects such as thermoplastic hose or tubing, comprises an enclosure for substantially surrounding the end portion of the object, means for substantially immobilizing the end portion within the enclosure and means for directing a stream of heated fluid around the inside and outside of the object along the length of the end portion. In a preferred embodiment, the enclosure is an insulated metal circular cylinder having at one end apertures for receiving the hose and controlling gas flow. At the other end, the enclosure has an apertured conical member for insertion into the hose to immobilize it in axial alignment with the central axis of the cylinder. A gas flow conduit for introducing a stream of heated air substantially tangentially onto the inner and outer surfaces of the hose cooperates with the walls of the hose and the enclosure to whirl hot air helically around the inner and outer surfaces of the hose along the length of the end portion.

BRIEF DESCRIPTION OF THE DRAWINGS

The nature, advantages and various additional features of the invention will appear more fully upon consideration of the illustrative embodiments now to be described in detail in connection with the accompanying drawings.

In the drawings.

For convenience of reference, the same reference numerals are used to designate the same structural features throughout the drawings.

DETAILED DESCRIPTION

Figure 1:
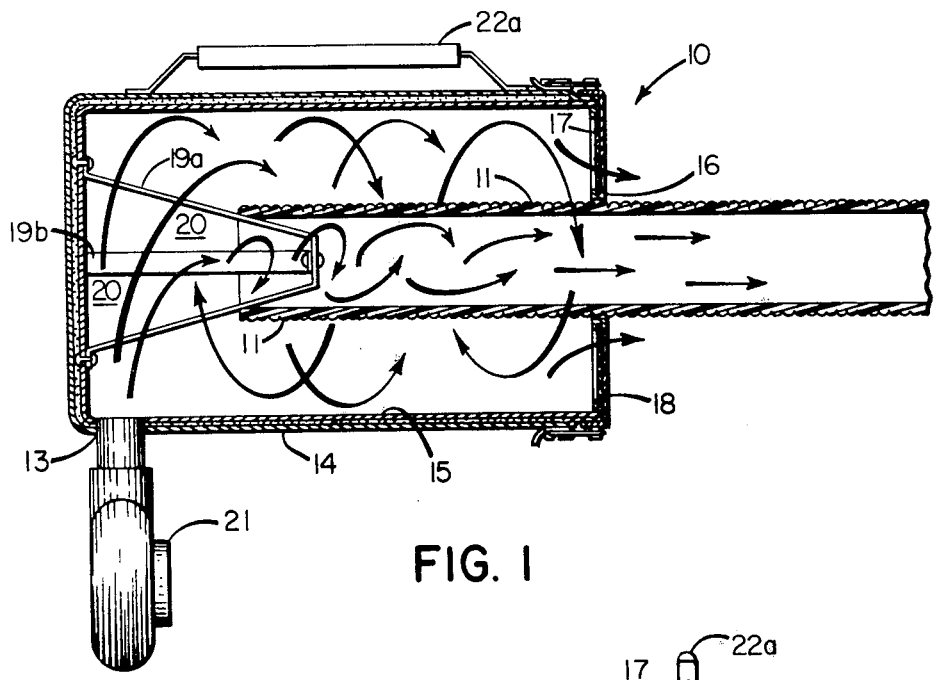
FIG. 1 is a schematic cross section of a preferred embodiment of a heating device in accordance with the invention showing a length of hose in position.
Figure 2:
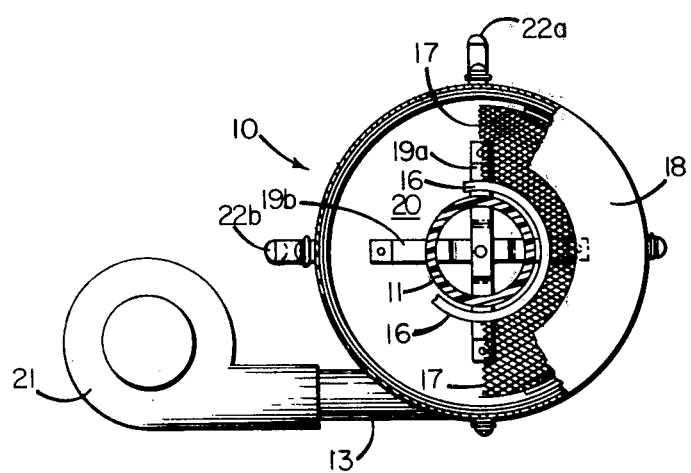
FIG. 2 is an end view of the device of FIG. 1.
Figure 3:
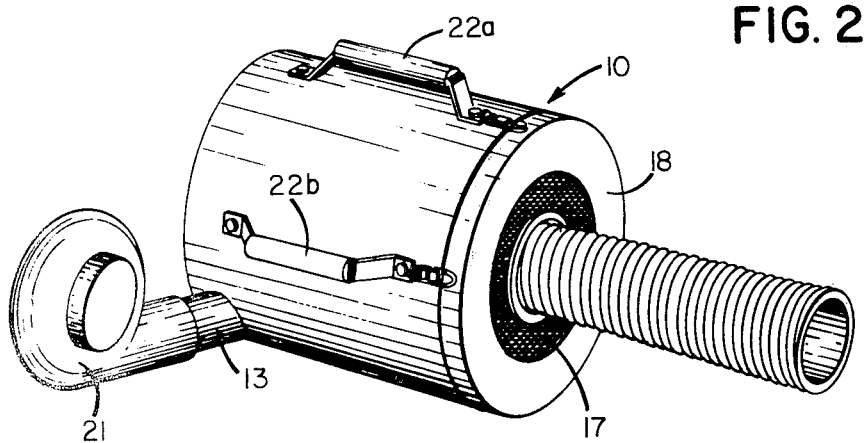
FIG. 3 is a perspective view of the device of FIG. 1.

Referring to the drawings, FIGS. 1–3 illustrate a preferred embodiment of the invention, comprising an enclosure 10 for substantially surrounding the end portion 11 of a hose; hose support means comprising apertured conical member 12 for substantially immobilizing the hose end within the enclosure; and gas directing means, comprising gas conduit 13, for directing gases around the hose along the length of the end portion.

In the preferred embodiment, enclosure 10 is preferably an insulated metal circular cylinder (an insulated metal "can") with the insulation 14 disposed exterior of interior metal wall 15 to aid in establishing a uniform interior temperature. One end of the cylinder is provided with an aperture 16 for receiving and centering hose end portion 11 and is additionally provided with venting means 17, such as an annular screen, for permitting escape and flow control of gas from the enclosure 10 after the gas has passed over the length of end portion 11. Advantageously, a plurality of removalbe end units 18 are provided with respectively different sized apertures suitable for respectively different sized hoses.

The open area of venting means 17 should be chosen or adjusted to produce a few ounces of back pressure of hot bas within the enclosure. If substantially greater back pressure is produced, it will be difficult to transfer heat from a hot air blower into the enclosure, and if substantially no back pressure is produced, there will be little transfer of heat from the gas to the hose. Preferred vent dimensions for different size hoses are tabulated hereinbelow The other interior end of the cylinder is preferably provided with one or more protruding support members, here an axially centered, generally concial apertured surface formed by a pair of converging metal straps, 19A and 19B, for insertion into the hose end portion 11. This support member, in cooperation with the aperture 16 of end unit 18, acts to center and support the hose end portion coaxially within the cylindrical enclosure.

The use of converging support straps provides automatic adjustment for different diameter hoses. They permit larger diameter hose to penetrate more deeply into the enclosure, thus effectively increasing the length of the hose heated. This automatic adjustment is advantageous because coupling shanks for larger diameter hose are typically of proportionately greater length.

In addition, the spaces 20 between the successive straps permit hot gas to pass into the interior or the hose and automatically adjust the amount of heated gas which can pass into the interior of the hose. As can be readily visualized, the spaces 20 are relatively small for small diameter hose, but are relatively small for small diameter hose, but are relatively larger for a deeper penetrating larger diameter hose because the straps spread farther apart as they approach the end of the enclosure. This has the effect of automatically permitting more hot gas to enter the interior of larger diameter hose. This automatic adjustment is advantageous because larger diameter hose has a correspondingly greater wall thickness, requiring a correspondingly greater amount of interior heating for uniform softening.

The gas conduit 13 is coupled to a source of hot gas 21, such as a hot air blower, and is oriented for directing hot gas from source 21 substantially circumferentially onto the hose. The hot gas is continuously redirected circumferentially around the inside and outside of the hose by the walls of the hose and the enclosure, respectively. In order to escape through the hose and the venting means 17, the gas swirls helically around the hose throughout the length of the enclosed end portion, simultaneously producing a substantially uniform heating of the inner and outer surfaces along the entire end portion.

Insulating handles 22A, and 22B can be attached for ease of handling.

Preferred dimensions and materials comprise an 11-inch diameter, 20-gauge steel cylindrical enclosure with a frustoconical support member having an 8.84-inch altitude, a 10.25-inch base and a 60° angle between the base plane and the circumferential surface of the cone. The gas conduit has a diameter of about two inches and is preferably coupled to a temperature adjustable model AH-501 Master Heat Blower marketed by Miller & Seddon, Cambridge, Massachusetts. For polyvinyl chloride hose the temperature is preferably adjusted to about 250° F.

A set of different end units are vented with ¼-inch hardware screen and provided with hose receiving and venting apertures as follows:

| Hose Diameter | Diameter of Hose Receiving Aperture | Area of Venting Aperture |
|---|---|---|
| 8" | 8.75" | 139.60 sq. in. |
| 6" | 6.75" | 35.44 sq. in. |
| 5" | 5.625" | 30.38 sq. in. |
| 4" | 5.625" | 25.88 sq. in. |

The advantages of this device are manifold. Because it is lightweight and portable, it can be placed on the end of the hose without extensive manipulation of the hose. Because it uses hot gases rather than hot liquids, the spillage and splashing safety hazard is eliminated and the risk of contamination is minimized. Furthermore, uniform heating is automatically ensured despite variations in hose diameter and thickness.

While the invention has been described in connection with a preferred specific embodiment, it is to be understood that this is merely illustrative of the many other specific embodiments which also utilize the principles of the invention. For example, while the invention is described as a heating device for thermoplastic hose, it is clear that with but minor modifications, it can be adapted for heating any hollow, elongated object. Similarly, while a conical surface is the preferred means for supporting and immobilizing the end of the hose, a wide variety of less advantageous support means, such as protuberances circumferentially surrounding the hose, could be substituted with some loss of effectiveness. Similarly, more complex and therefore less advantageous gas direction means could be substituted for the simple arrangement described here. Thus, mumerous and varied devices can be made by those skilled in the art without departing from the spirit and scope of the present invention.

What is claimed is:

1. A portable device for heating an end portion of thermoplastic comprising:
    an insulated metal cylindrical enclosure having an apertured end for receiving such hose;
    at the other end of said cylinder, support means for immobilizing such hose end portion within said enclosure; and;
    gas direction means for directing a stream of heated gas helically around the inner and outer surfaces of such hose along the length of the end portion.

2. A heating device according to claim 1 wherein said support means comprises at least one protruding member for fitting into said hose.

3. A heating device according to claim 2 wherein:
    said cylinder comprises a circular cylinder having a central axis;
    said apertured end comprises means for venting gas from said cylinder;
    said protruding member and said apertured end are disposed and oriented for immobilizing such hose end portion along said central axis of said cylindrical enclosure; and
    said gas direction means comprises gas conduit means for directing a stream of heated gas substantially circumferentially onto the inner and outer surfaces of such hose.

4. A portable device for heating an end portion of thermoplastic hose comprising:
    an insulated metal cylindrical enclosure having an apertured end for receiving such hose;

at the other end of said cylinder, support means for immobilizing such hose end portion within said enclosure comprising a protruding member convex toward the interior of said enclosure for centering said hose within said cylindrical enclosure and adjusting the length of the end portion included within said enclosure when the hose is positioned on said member; and gas direction means for directing a stream of heated gas circumferentially onto the interior and exterior surfaces of such hose.

5. A device according to claim 4 for heating an end portion of hose comprising:

an insulated metal cylindrical enclosure having an apertured end for receiving such hose;

at the other end of said cylinder, support means for immobilizing such hose end portion within said enclosure comprising a plurality of protruding straps converging toward the interior of said enclosure.

6. A heating device according to claim 1 further comprising a source of hot air coupled to said gas direction means.

7. A portable device for heating an end portion of an elongated hollow thermoplastic hose comprising:

enclosure means for substantially surrounding at least such end portion of such hose;

support means comprising a protruding member convex toward the interior of said enclosure for fitting into said hose and for (a) centering said hose within said enclosure, (b) adjusting the length of the end portion included within said enclosure, and (c) substantially immobilizing such end portion within said enclosure; and fluid direction means for directing a stream of heated fluid around the inner and outer surfaces of such hose.

8. A device according to claim 7 wherein said enclosure means is an insulated metal cylinder having an apertured end for receiving such hollow object.

9. A heating device according to claim 7 wherein said support means comprises a generally conical member for fitting into such hollow object.

10. A heating device according to claim 7 wherein said fluid direction means comprises means for directing a stream of heated gas helically around the inner and outer surfaces of such object along the length of such end portion.

* * * * *

UNITED STATES PATENT AND TRADEMARK OFFICE
CERTIFICATE OF CORRECTION

PATENT NO. : 4,255,137
DATED : March 10, 1981
INVENTOR(S) : Nathan E. Guyer

It is certified that error appears in the above-identified patent and that said Letters Patent are hereby corrected as shown below:

Column 2, line 61, "removalbe" should read --removable--; and
          line 66, "hot bas" should read --hot gas--.
Column 3, line 4, "hereinbelow" should read --hereinbelow.--;
          line 23, "interior or the hose" should read
          --interior of the hose"; and
          lines 27-28, "small diameter hose. but are relatively small for small diameter hose. but are relatively larger" should read --small diameter hose, but are relatively larger--.
Column 4, line 33, "mumerous" should read --numerous--; and
          line 39, "thermoplastic comprising" should read --thermoplastic hose comprising:--.
Column 6, line 23, "gas" should read --fluid--.

Signed and Sealed this

Twenty-fifth Day of August 1981

[SEAL]

Attest:

GERALD J. MOSSINGHOFF

Attesting Officer

Commissioner of Patents and Trademarks